(12) United States Patent
Daloz et al.

(10) Patent No.: US 8,576,854 B2
(45) Date of Patent: Nov. 5, 2013

(54) SYSTEM FOR COMMUNICATION BETWEEN PRIVATE AND PUBLIC IP NETWORKS

(75) Inventors: Claude Daloz, Lannion (FR); Yacine Zoughlami, Gennevilliers (FR); Frèdèric Felten, Tonquedec (FR)

(73) Assignee: France Telecom, Paris (FR)

( * ) Notice: Subject to any disclaimer, the term of this patent is extended or adjusted under 35 U.S.C. 154(b) by 153 days.

(21) Appl. No.: 10/586,504

(22) PCT Filed: Dec. 24, 2004

(86) PCT No.: PCT/FR2004/003387
§ 371 (c)(1),
(2), (4) Date: Feb. 26, 2007

(87) PCT Pub. No.: WO2005/079014
PCT Pub. Date: Aug. 25, 2005

(65) Prior Publication Data
US 2007/0258470 A1 Nov. 8, 2007

(30) Foreign Application Priority Data
Jan. 16, 2004 (FR) ...................................... 04 00425

(51) Int. Cl.
*H04L 12/28* (2006.01)
*H04L 12/56* (2006.01)
(52) U.S. Cl.
USPC ........ 370/401; 370/392; 370/395.2; 709/219; 709/228; 726/11; 726/12; 726/15
(58) Field of Classification Search
USPC ............... 370/389, 395.52, 395.53, 401, 360, 370/392, 395.2; 455/237, 203; 709/217–219, 227–229, 237, 238; 726/11, 12, 14, 15
See application file for complete search history.

(56) References Cited

U.S. PATENT DOCUMENTS

| | | | | |
|---|---|---|---|---|
| 5,944,823 | A * | 8/1999 | Jade et al. | 726/15 |
| 6,304,973 | B1 * | 10/2001 | Williams | 726/3 |
| 6,631,416 | B2 * | 10/2003 | Bendinelli et al. | 709/227 |
| 7,254,832 | B1 * | 8/2007 | Christie, IV | 726/11 |
| 7,274,684 | B2 * | 9/2007 | Young et al. | 370/352 |
| 7,283,542 | B2 * | 10/2007 | Mitchell | 370/401 |
| 7,366,188 | B2 * | 4/2008 | Kim | 370/401 |
| 7,380,011 | B2 * | 5/2008 | Li et al. | 709/227 |
| 2001/0023482 | A1 | 9/2001 | Wray | |
| 2002/0013848 | A1 | 1/2002 | Rene Salle | |
| 2002/0023210 | A1 * | 2/2002 | Tuomenoksa et al. | 713/161 |
| 2002/0124064 | A1 * | 9/2002 | Epstein et al. | 709/221 |
| 2003/0009561 | A1 * | 1/2003 | Sollee | 709/227 |
| 2003/0131258 | A1 * | 7/2003 | Kadri | 713/201 |
| 2003/0188001 | A1 * | 10/2003 | Eisenberg et al. | 709/229 |
| 2004/0028035 | A1 * | 2/2004 | Read | 370/352 |

(Continued)

*Primary Examiner* — Michael Thier
*Assistant Examiner* — Benjamin H Elliott, IV
(74) *Attorney, Agent, or Firm* — Cozen O'Connor

(57) ABSTRACT

A system for communication between a first computer terminal (1) in a private IP network (7) and a second computer terminal (5) in a public IP network includes a network boundary equipment (3). The communications system further includes a mediation system (2) in the private IP network that is associated with the first terminal (1) and is adapted to make an IP interface available to the second terminal (5), and a control server (4) in the public IP network able to control the mediation system 2 via a communications tunnel (6) through the network boundary equipment (3).

13 Claims, 1 Drawing Sheet

(56) References Cited

U.S. PATENT DOCUMENTS

| | | | |
|---|---|---|---|
| 2004/0054927 A1* | 3/2004 | Leppanen et al. | 713/201 |
| 2004/0215785 A1* | 10/2004 | Shima | 709/227 |
| 2004/0218611 A1* | 11/2004 | Kim | 370/401 |
| 2005/0060328 A1* | 3/2005 | Suhonen et al. | 707/100 |

* cited by examiner

SYSTEM FOR COMMUNICATION BETWEEN PRIVATE AND PUBLIC IP NETWORKS

This is a U.S. national stage of application No. PCT/FR2004/003387, filed on 24 Dec. 2004.

FIELD OF THE INVENTION

The present invention relates to a system for communication between a first computer terminal in a private IP network and a second computer terminal in a public IP network.

Generally speaking, one particularly advantageous application of the invention is to IP communication between public networks and private networks, especially when a public IP network has to communicate with a private IP network.

BACKGROUND OF THE INVENTION

RFC (Request For Comments) 1918 of the IANA (Internet Assigned Number Authority) covers private networks and private addresses intended to remedy the limited number of IP addresses in version 4 of the IP standard. Routers of the public network, for example the Internet, cannot route to private addresses, which are assigned in particular ranges. This enables a large number of computer terminals to be connected to the same private network.

Terminals in the private network that need to communicate with computer terminals in the public network must do so via network boundary equipments, some of which are referred to as gateways and have an IP address in the public network and an IP address in the private network. They serve as agents of the terminals of the private network in respect of requests to the public network. They receive requests from a private terminal at their private IP address and forward those requests on the public network using their public IP address. When the response to a request reaches the gateway, the gateway forwards it to the private network terminal that submitted the request using its private address. RFC 3022 covers this NAT (Network Address Translation) mechanism.

Another kind of network boundary equipment associated with gateways and known as a firewall serves as a security entity controlling access to and from the Internet. Firewalls are the subject of more or less restrictive rules.

Certain types of application use proxies (proximity agents) specific to particular protocols, the best known being HTTP (HyperText Transfer Protocol) and FTP (File Transfer Protocol) proxies. These proxies receive requests from private network terminals and forward them over the public network in the name of the private network terminals. They may be placed behind gateways. Because they are obligatory points for communications conforming to a given protocol to pass through, particular services have been added to them, such as a cache mechanism in the case of HTTP proxies.

One of the main features of the NAT mechanism is that it is asymmetrical. An IP packet can pass freely from the private network to the public network. In contrast, a packet can pass from the public network to the private network only if a packet has previously taken the opposite route. Thus a private network terminal must take the initiative for any communication.

The underlying mechanism is based on the route concept. For an equipment performing a NAT operation, a route is a set of three "IP address-port" pairs. When a packet from the private network reaches the network boundary equipment, which stores the "IP address-port" pair of the computer terminal of the private network that sent the packet, that pair being called pair1. The destination "IP address-port" pair in the public network is called pair2 and the "IP address-port" pair of the public interface of the boundary network equipment via which the packet will be forwarded is called pair3. When a packet from the public network reaches the public interface, the network boundary equipment looks for a corresponding route, i.e. the route whose source corresponds to pair2 and whose destination corresponds to pair3 of a route previously elected. If there is a previously elected route, the packet is forwarded to pair1 of the elected route. If there is no previously elected route, the packet is not forwarded on the private network. Thus a packet arriving from the public network can be forwarded on the private network only if a packet from the private network has previously created a route for it. Hence the asymmetrical nature of the NAT mechanism.

This mechanism has many limitations that have become increasingly obvious as the diversity of applications on the Internet has increased and private networks have proliferated: private networks are no longer restricted to corporations, but are equally relevant to a large proportion of the general public, usually connected via ADSL.

Consider a help service, for example. Increasing numbers of computer terminals are now equipped with an onboard HTTP server used for the purposes of configuration. For example, it is not possible at present to obtain assistance by having a technician on a public network verify and correct a faulty equipment configuration via an HTTP connection. At best, a technician can ask the customer to redirect a port of a gateway to the equipment in question by the customer personally creating a route, an operation that is just as unfeasible for the customer as it would be for the customer to correct the configuration without help from the technician.

The rules governing firewalls range from the simplest to the most complicated, the simplest rules authorizing everything or nothing. To implement a more coherent security strategy, firewalls at present rely on application type. Authorizing an application to access the Internet in fact authorizes packets addressed to the port associated with that type of application to access the Internet (port 80 for HTTP, port 21 for FTP). Certain new applications, for example games, telephone, and videophone applications, use a multitude of ports, which are often assigned dynamically. Dynamic assignment prevents the definition of adequate rules. It becomes essential to allow all packets to pass or at best to open a complete range of ports, which is an unsatisfactory strategy from the security point of view.

SUMMARY OF THE INVENTION

One object of the present invention is to provide a system for communication between a first computer terminal in a private IP network and a second computer terminal in a public IP network, which communications system includes a network boundary equipment. Such a communications system is provided to solve the problem of incoming connections to a private network, simplify the security strategy applied at the boundary of the private network, without compromising it, and it requires minimal or no configuration of the existing elements of the boundary equipment, gateway, and firewall.

These and other objects are attained in accordance with one aspect of the present invention directed to a system for communication between a first computer terminal in a private IP network and a second computer terminal in a public IP network. The communications system includes a network boundary equipment, and a mediation system in the private IP network that is associated with the first terminal and is adapted to make an IP interface available to the second terminal. A control server is provided in the public IP network that is able to control the mediation system via a communications tunnel through the network boundary equipment.

DETAILED DESCRIPTION OF THE DRAWINGS

Figure 1:
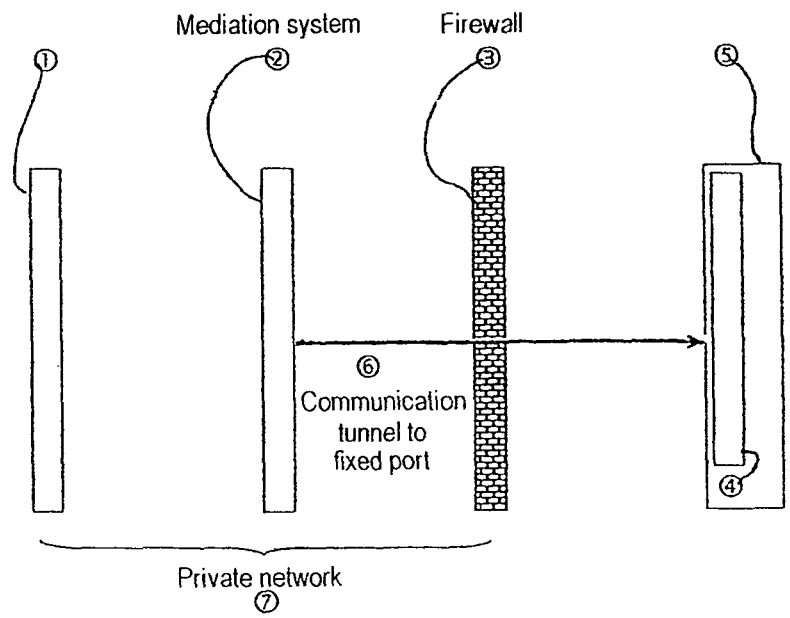
FIG. 1 is a general block diagram of a communications system of the invention.

FIG. 1 shows a system for communication between a first computer terminal 1 in a private IP network 7 and a second computer terminal 5 in a public IP network, said system comprising a network boundary equipment 3 of the gateway and/or firewall type. The FIG. 1 communications system must be able to communicate through the network boundary equipment 3, simplify the process of configuring the equipment and ensure good performance. The system is independent of the protocols above the TCP (Transmission Control Protocol) and the UDP (User Datagram Protocol). It can be used for all types of application that seek an effective solution to the problem of communicating through gateways and firewalls.

A mediation system 2 on the private network 7 has a TCP/UDP/IP interface and, generally speaking, the terminal 5 must be able to use the TCP/UDP/IP interface of the mediation system 2 to render the service that it offers. The mediation system 2 therefore makes its TCP/UDP/IP interface available to the terminal 5 via a control server 4.

To this end a communications tunnel 6 is created between the mediation system 2 and the control server 4 through the gateway/firewall 3.

The mediation system 2 and the control server 4 are completely generic and only the computer terminal requires the intelligence needed for the service rendered to the terminal 1 of the private network 7.

The internal IP terminal 1 uses the mediation system 2 to communicate with the external IP terminal 5, which communicates with the control server 4. To comply with the general rules for communicating through the NAT mechanism and firewall, the system 2 sets up the tunnel 6 to the server 4 via a single fixed port. This minimizes the impact on the configuration of the router and manages the connections of clients to servers efficiently.

The single fixed port of the control server 4 is referred to below as the "service port".

The tunnel 6 consists of a TCP channel and where applicable a plurality of UDP channels between any port of the system 2 and the service port of the server 4

Figure 2:
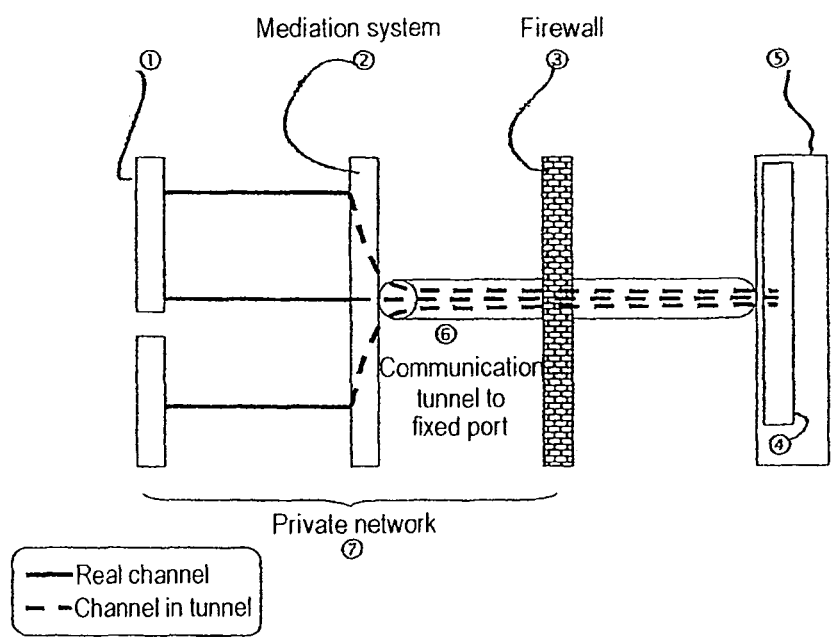
FIG. 2 is a detailed diagram of the FIG. 1 communications system.

A detailed description of the operation of the communications system of the invention is given below with reference to FIG. 2.

To be initialized, the mediation system 2 connects to a fixed port of the control server 4 via a TCP channel. It uses this connection to inform the server 4 about its state and about its environment. This information can range from a description of its configuration in the private network 7 (IP address, subnetwork mask, etc.), through authentication or identification, to a description of the service that it wishes to use.

Once initialization has been effected, three types of operation are effected between the system 2 and the server 4:

Requests: open, redirect, connect, make server, and close ports.
Packet and event relay.
Maintain channel.

A light protocol is used between the system 2 and the server 4 to announce and describe these operations. Only the semantics of this protocol are described here, the syntax being left to the discretion of the producers of the service.

1. Open, Redirect, and Close Port Requests

The server 4 sends open, redirect and close port requests to the mediation system 2.

Open Port:

The server 4 requests the opening of a port by sending the IP address and the number of the port to be opened (the mediation system 2 may be on a machine of the local area network that has a plurality of IP addresses on that network), the type of service (TCP or UDP), and the importance assigned to the port number (it is possible to request either a desired (but not obligatory) port number, in which case the first free port starting from the number requested is assigned, or on the contrary an obligatory port number can be requested).

The response to the open port request consists in sending an identifier of the opened port and the assigned port number, or an error code if the request fails.

Redirect Port:

The redirection of ports responds to a particular constraint.

The service channel is based on the TCP and can forward TCP or UDP packets that arrive at the internal interface of the mediation system 2.

Particular characteristics are added to packets in transit arriving over UDP on the TCP channel. The TCP is a reliable protocol compared to the UDP, in that the receiver acknowledges packets in transit over TCP. The sender sends again packets that are not acknowledged. This reliability mechanism involves a delay. Certain applications opt to use the UDP to avoid the delay induced by the reliability mechanism. The object of the port redirection mechanism is to enable the application implementing the invention to retain the UDP as the underlying transport layer.

The server 4 requests the redirection of a port by sending the IP address and the number of the port to be redirected (the mediation system 2 can be on a machine of the local area network that has a plurality of IP addresses on that network), and the importance assigned to the port number (it is possible to request either a desired (but not obligatory) port number, in which case the first free port starting from the number requested is assigned, or on the contrary an obligatory port number can be required).

The response to the redirection request consists in sending an identifier of the redirected port and the assigned port number, or an error code if the request fails.

Once redirection has been effected, any packet arriving at the redirected port is systematically relayed to the server 4 at its fixed port using the UDP.

Connect Port:

The server 4 requests the mediation system 2 to connect a previously opened TCP port to an IP address and an IP port of the private network 7. The request is sent with the identifier of the previously opened port, the IP address and the port to which it must connect.

The response to the connection request consists in sending an acknowledgement code or an error code if the request fails.

Make Server Port:

There are two types of TCP port:

server (service) ports, which accept connections from other ports and are therefore "listening" (this is typically the case of the ports 80 of HTTP servers), and
client (connection) ports, which are connected to the server ports.

When opened (using the mechanism described above), a TCP port is not yet dedicated. It becomes a client port (mediation system 2) as soon as the server 4 requests its connection to another port.

To dedicate an open TCP port as a server port, the server portion of the invention sends the client portion (mediation system 2) a make server request giving the identifier of the opened port concerned.

The response to the make server request consists in sending an acknowledgement code, or an error code if the request fails.

Close Port:

The server 4 requests the closing of a port by sending the identifier of the port received at the time of opening or redirecting it.

The response to the close request consists in sending an acknowledgement code, or an error code if the request fails.

2. Packet and Event Relay

Packet Relay:

This operation is bidirectional. The server 4 can request the mediation system 2 to forward a packet on the private network 7, specifying the identifier of the port to be used to forward the packet (this is the identifier received on opening the port), the IP address and the number of the destination port and the packet to be forwarded.

In the other direction, the mediation system 2 relays a packet that it has received to a port opened beforehand by the server 4, indicating the identifier of the receiver port, the IP address and the number of the sending port and the packet received.

Event Relay:

The events relayed by the client (mediation system 2) to the server 4 are events at the opened ports. These events are:

Connection of an IP system of the internal network 7 to an opened TCP server port (corresponding to the sequence SYN, SYN/ACK, ACK).

Request for closure (message TCP FIN) or destruction (message TCP RST) of a TCP connection.

3. Maintain Channel

There may be active route scrutinizing mechanisms in all of the network equipments through which the tunnel 6 between the client (system 2) and the server 4 passes. These mechanisms verify that the routes, i.e. the three "IP address-port" pairs, are not obsolescent If no packet having these pairs for its source and destination coordinates passes through the equipment 3 during a period called the time to live (TTL), the route is destroyed, for example to prevent a later packet from the server 4 passing through the equipment 3 to the client 2. This breaks the tunnel 6.

To avoid this problem, the client 2 sends a packet (known as the maintain channel packet) over the opened channels to the server 4 before the end of the TTL of the channel in question.

The invention claimed is:

1. A method for communication between a first computer terminal of a private Internet Protocol (IP) network and a second computer terminal of a public IP network, the method comprising:

initializing a connection, by a mediation system which is associated with the first computer terminal in the private IP network, to a dedicated service port of a control server in the public IP network, the mediation system being separated from the public IP network by a network boundary equipment of the private IP network;

establishing, by the mediation system, a communications tunnel between the mediation system and the dedicated service port of the control server, through the network boundary equipment;

receiving at least one port operation request, from the control server, at the mediation system via the communications tunnel established through the network boundary equipment;

performing, by the mediation system, the at least one requested port operation, resulting in an IP interface of the mediation system which is available to the second computer being connected to an IP interface of the first computer.

2. The method of claim 1, wherein the at least one requested port operation comprises opening a port of the mediation system, the opening of the port comprising:

receiving, by the mediation system, from the control server, an open port request comprising an IP address of the mediation system and a port number of the mediation system to be opened; and sending, by the mediation system, to the control server, an identifier of the opened port and an assigned port number of the opened port.

3. The method of claim 1, further comprising a port operation of redirecting a port of the mediation system, the redirecting of the port comprising:

receiving, by the mediation system, from the control server, a redirect request comprising an IP address of the mediation system and a port number of the mediation system to be redirected; and sending, by the mediation system, to the control server, an identifier of the redirected port of the mediation system and an assigned port number of the redirected port of the mediation system, wherein packets arriving at the redirected port of the mediation system are relayed to the dedicated service port of the control server using user datagram protocol (UDP).

4. The method of claim 1, wherein the at least one requested port operation comprises connecting a port of the mediation system to a port of the private network, the connecting of the port comprising:

receiving, by the mediation system, from the control server, a connect port request comprising an identifier of a previously-opened port of the mediation system and an IP address and port number to which connection is requested in the private network.

5. The method of claim 1, further comprising a port operation of making a port of the mediation system a server port, the server port operation comprising:

receiving, by the mediation system, from the control server, a make server request comprising an identifier of a previously-opened port of the mediation system for which configuration as a server port is requested.

6. The method of claim 1, further comprising a port operation of closing a port of the mediation system, the closing operation comprising:

receiving, by the mediation system, from the control server, a close port request comprising an identifier of a previously-opened port of the mediation system for which closing is requested.

7. The method of claim 1, further comprising a port operation of performing packet relay at a port of the mediation system, the relay operation comprising:

receiving, by the mediation system, from the control server, a packet relay request comprising an identifier of a previously-opened port of the mediation system and an IP address and port number to which forwarding is requested in the private network.

8. The method of claim 1, further comprising a port operation of performing packet relay at a port of the mediation system, the relay operation comprising:

receiving, by the mediation system, a packet from the private network at a previously-opened port of the mediation system; and sending, by the mediation system, a packet relay statement comprising an identifier of the previously-opened receiving port of the mediation system, an IP address and a port number of a sending port of the private network, and the received packet.

9. The method of claim 1, further comprising transmitting information, by the mediation system, to the control server relating to the configuration of the mediation system in the private network.

10. A system for communication between a first computer terminal of a private Internet Protocol (IP) network and a second computer terminal of a public IP network, the private IP network comprising network boundary equipment, the system comprising:
   a control server which is associated with the second computer terminal in the public IP network, the control server being configured to perform a port operation at the mediation system via a communications tunnel established through the network boundary equipment; and
   a mediation system which is associated with the first computer terminal in the private IP network, and which is configured to initialize a connection to a dedicated service port of the control server in the public IP network, the mediation system being separated from the public IP network by a network boundary equipment of the private IP network,
   wherein the mediation system is configured to establish the communications tunnel between the mediation system and the dedicated service port of the control server, through the network boundary equipment.

11. The system of claim 10, wherein the port operation is opening a port of the mediation system, and wherein the mediation system is configured to:
   receive from the control server, an open port request comprising an IP address of the mediation system and a port number of the mediation system to be opened; and
   send to the control server, an identifier of the opened port and an assigned port number of the opened port.

12. The system of claim 10, wherein the port operation performing packet relay at a port of the mediation system, and wherein the mediation system is configured to receive from the control server a packet relay request comprising an identifier of a previously-opened port of the mediation system and an IP address and port number to which forwarding is requested in the private network.

13. The system of claim 10, wherein the port operation is performing packet relay at a port of the mediation system, and wherein the mediation system is configured to:
   receive a packet from the private network at a previously-opened port of the mediation system; and
   send a packet relay statement comprising an identifier of the previously-opened receiving port of the mediation system, an IP address and a port number of a sending port of the private network, and the received packet.

* * * * *